United States Patent Office 3,839,485
Patented Oct. 1, 1974

---

3,839,485
CATALYTIC STEAM CRACKING OF HYDROCARBONS AND CATALYSTS THEREFOR
Johannes Wrisberg, Gammel Holte, and Kjeld Jorn Andersen, Hillerod, and Erik Mogensen, Helsinge, Denmark, assignors to Haldor Topsoe A/S, Soborg, Denmark, and Fluor Corporation, Los Angeles, Calif.
No Drawing. Continuation-in-part of abandoned application Ser. No. 99,237, Dec. 17, 1970. This application Aug. 21, 1973, Ser. No. 389,646
Claims priority, application Great Britain, Dec. 23, 1969, 62,553/69
Int. Cl. C07c 3/34
U.S. Cl. 260—683 R    12 Claims

ABSTRACT OF THE DISCLOSURE

Steam cracking of saturated hydrocarbons to form unsaturated hydrocarbons, such as ethylene and propylene, is carried out in the presence of a zirconia catalyst prepared from amorphous zirconium oxide and promoted by 0.1–10% of an alkali metal compound calculated as weight of oxide. Zirconium compounds which form amorphous zirconium oxide on heating can be used in the preparation of the catalysts, which are particularly resistant to carbon deposition.

---

This application is a continuation-in-part of United States Patent Application Ser. No. 99,237 filed Dec. 17, 1970 now abandoned.

The present invention relates to a process for manufacturing unsaturated hydrocarbons by catalytic steam cracking of saturated hydrocarbons and to catalysts for this purpose. More particularly, the invention relates to a process of manufacturing ethylene and propylene by steam cracking of saturated hydrocarbons in the presence of a zirconium oxide catalyst.

It is known to manufacture ethylene and propylene by thermal, non-catalytic cracking of higher hydrocarbons, such as light naphtha, in the presence of steam. Such a thermal steam cracking process is normally carried out by passing the steam hydrocarbon mixture through empty tubes heated to a temperature above 800° C. in the cracking zone. This process, however, requires a critical selection of materials for reactor tubes and a critical selection of the operating conditions. It is generally desirable to replace a non-catalytic process by a catalytic process provided that a proper catalyst is available since the use of a catalyst tends to decrease the required operating temperature and to increase the selectivity and yield of desired products.

A catalytic process for the manufacture of unsaturated hydrocarbons, including ethylene and propylene, has been described in U.S. Pat. No. 3,308,200. The main reaction that takes place in that process is the removal by a dehydrogenation reaction of two adjacent hydrogen atoms from the hydrocarbon molecule of the starting material. This dehydrogenation is carried out by passing the hydrocarbon together with chlorine or a chlorine liberating material, free oxygen, and a diluent such as steam through a catalyst. The disadvantage of the process is that the starting material is limited to a hydrocarbon having the same number of carbon atoms per molecule and the same chain structure as the desired product.

Another catalytic process in which ethylene and propylene can be manufactured from a wide selection of starting materials has been proposed in French Pat. No. 1,127,494. In that process higher hydrocarbons, for example a light naphtha fraction, are subjected to steam cracking in the presence of a catalyst which is capable of cutting the C—C bonds of the hydrocarbon chains and of promoting the reaction between steam and carbon. It is furthermore claimed that the catalyst should have a low dehydrogenating activity since otherwise too much carbon may be formed.

Useful catalyst compositions having such properties have been proposed in Dutch Patent Application No. 69 08283. These catalyst compositions are based on a few percent of the oxides of the rare earth metals together with a mixture of inactive oxides, either containing 30–70% magnesium oxide or 25–40% zirconium oxide. A great number of other metal oxides may be included in these catalyst compositions. It is claimed in the Dutch application that a stable catalyst composition resistant to carbon deposition and having a low porosity and a specific surface area in the range from 0.02 to 1m.$^2$/g. can be obtained by heating the mixture of oxides to a temperature of at least 1,300° C. This heat treatment results in a solid solution of the oxides through solid diffusion.

We have found that a catalyst having a high content of zirconium oxide, especially a zirconium oxide content of greater than 90 weight percent, is very useful in the manufacture of ethylene and propylene by steam cracking of higher hydrocarbons. However, there are problems in connection with the preparation and use of zirconium oxide catalysts. It is known to press the oxide powder into pellets of the desired size and shape and to obtain an acceptable mechanical strength of the pellets by heating to a temperature above 1000° C. or even 1300° C. However, pure zirconium oxide undergoes a reversible allotropic transformation at about 1000° C. involving a considerable change in volume (about 9%). This volume change has a detrimental effect on the mechanical properties of the catalyst particles and it is, therefore, necessary to turn the zirconium oxide into a stabilized form. This can be achieved by reacting it with certain inactive oxides among which are magnesium oxide. It is known that this reaction is promoted by the presence of certain other oxides among which are the oxides of the rare earth metals, for example lanthanum oxide.

It is an object of the present invention to provide a process for the manufacture of unsaturated hydrocarbons, such as for example ethylene and propylene, by steam cracking of saturated hydrocarbons in the presence of a zirconium oxide catalyst and in the absence of free oxygen and chlorine prepared by a method involving heating to a temperature below 1000° C. while still avoiding significant carbon deposition on the catalyst.

It has now been found that heating of the catalyst to temperatures above 1000° C. and simultaneous reaction of the zirconium oxide with one or more inactive oxides is not necessary if at least a part of the raw material from which the zirconium oxide catalyst is prepared consists of amorphous zirconium oxide and/or a zirconium compound which upon heating is transformed into amorphous zirconium oxide.

It has furthermore been found that the resistance to carbon deposition of such a zirconium oxide catalyst can be considerably improved by adding an alkali metal compound to the catalyst. This promoting effect of an alkali metal compound is well-known from other steam hydrocarbon reactions conducted in the presence of a catalyst.

According to the present invention we provide a process for the manufacture of unsaturated hydrocarbons, such as ethylene and propylene, by a gaseous catalytic reaction wherein a feedstock substantially comprising saturated hydrocarbons is contacted at a temperature below 1100° C. and a pressure of 0.1–50 atm. in the presence of added steam and free of chlorine and of free oxygen with a zirconium oxide catalyst prepared from a raw material of which at least a part is amorphous zirconium oxide, and/or a zirconium compound which upon heating transforms into amorphous zirconium oxide, which zirconium oxide catalyst contains from 0.1 to 10 wt. percent of an alkali metal compound calculated as the oxide.

Further according to the present invention we provide a catalyst for the manufacture of unsaturated hydrocarbons such as ethylene and propylene, from saturated hydrocarbons in the presence of steam prepared from a raw material of which at least a part is amorphous zirconium oxide and/or a zirconium compound which upon heating transforms into amorphous zirconium oxide, which zirconium oxide catalyst contains from 0.1 to 10 wt. percent of an alkali metal compound calculated as the oxide.

In a preferred embodiment of the invention, the reaction is carried out at a temperature in the range 200°–900° C. preferably in the range 500°–850° C. It is also preferred to use pressures in the range 1–15 atm. measured at the reactor outlet.

The feedstock may consist of a single saturated hydrocarbon, or a mixture of saturated hydrocarbons and may contain a minor proportion of unsaturated hydrocarbons if this is required to obtain desired products. Suitable saturated hydrocarbons include propane, butane, as well as liquid hydrocarbons such as light naphtha and even crude oils. Our process and catalyst readily tolerate the presence of the sulphur, which can even be desirable since it can passivate the free metal surfaces in the reactor. The sulphur may be originally present in the feed stock or it may be added in the form of the free element of as compounds such as organic sulphur compounds, hydrogen sulphide, or carbon disulphide.

It is an important advantage of the process of the invention that a wide selection of starting materials can be used. Because the reactions taking place in the process include cracking-dehydrogenation reactions, higher hydrocarbons, such as hydrocarbons having four, five, or more carbon atoms per molecule, can be converted into the useful products, ethylene and propylene.

Steam should be added to give a weight ratio of steam to hydrocarbon feedstock of 0.01–10 in the reactor. The ratio should be preferably the lowest which avoids significant carbon deposition on the catalyst, say 0.1–1.0.

Our process can be operated at low temperatures and the low energy requirements give high termal efficiencies. The demands made on the equipment are accordingly reduced, resulting in low capital costs and also in reduced vulnerability of materials during operation. The design/operating requirements are less stringent, giving much greater flexibility and safety, compared to the thermal cracking process.

The catalyst is a zirconium oxide catalyst prepared from a raw material of which at least a part is amorphous zirconium oxide or a zirconium compound which on heating transforms into amorphous zirconium oxide. The raw material mixture is formed into a powder which is then compressed into particles of the desired size and form. The necessary strength is obtained during a heat treatment. It is a particular feature of the catalyst used in accordance with the present invention that it can obtain excellent mechanical properties by a simple heating to a temperature below 1000° C. preferably a temperature in the range from 700 to 900° C. In this way the problems connected with the allotropic transformation of zirconium oxide at about 1000° C. have been eliminated. This result has been achieved by the presence of amorphous zirconium oxide in the catalyst particles during the heat treatment.

If catalyst particles are prepared from crystalline zirconium oxide alone, they do not achieve adequate mechanical strength by heating to temperatures below 1000° C. This is because the zirconium oxide crystals do not start to react with each other until the temperature is much higher than 1000° C. However, if amorphous zirconium oxide is present the reaction starts at temperatures much lower than 1000° C. The amorphous zirconium oxide may either be present in the raw material powder from which the catalyst particles are prepared or it may be formed during the actual heating by transformation of a zirconium compound included in the raw material powder. Examples of zirconium compounds which are transformed on heating into amorphous zirconium oxide are basic zirconium carbonate and zirconium hydroxide.

The molar ratio amorphous zirconium oxide to total zirconium oxide is not very critical. The ratio may be as low as 10% or all the zirconium oxide may be in the form of amorphous zirconium oxide or a zirconium compound which on heating transforms into amorphous zirconium oxide. Preferably, the ratio should be at least 15%.

It is important that carbon does not accumulate on the zirconium oxide catalyst during its use in steam cracking of hydrocarbons. Alkali metals are known to promote the reaction between carbon and steam and the presence of an alkali metal compound in the zirconium oxide catalyst tends to reduce or eliminate the deposition of carbon. It has been found that an amount from 0.1 to 10 wt. percent alkali metal compound calculated as the oxide will effectively eliminate carbon deposition, the preferred range being from 0.3 to 7 wt. percent alkali metal calculated as the oxide. The alkali metal compound can be added in several ways. It can be incorporated in the raw material powder or it can be added to the catalyst after its heat treatment by impregnating a solution of an alkali metal compound. It can even be added to the catalyst in the form of an alkali metal vapor or a vapor of an alkali metal compound. Examples of suitable alkali metal compounds are nitrates, oxides, and hydroxides. Particularly suitable are potassium compounds.

In order that the invention should be better understood, it will now be described in further detail with particular reference to the following examples:

PREPARATION OF CATALYSTS

Compositions and properties of the catalysts of Examples I–VI are given in table I. Examples I, II, and III illustrate comparative catalysts while Examples IV, V and VI illustrate catalysts in accordance with the present invention. Detailed descriptions of the preparation of each of the catalysts are given below.

Example I (Comparative Catalyst)

321 g. of a wet filter cake of basic zirconium carbonate containing 46 wt. percent zirconium calculated as the oxide was suspended in 4.2 l. water together with 39 g. silicium dioxide and 169 g. magnesium oxide. 130 g. lanthanum nitrate, $La(NO_3)_3 \cdot 6 H_2O$, was dissolved in the suspension. Concentrated aqueous ammonia was then added in a slight excess to precipitate hydroxide. The resulting suspension was filtered and washed. The filter cake was dried for 16 hours at 150° C. and ground for four hours in a ball mill together with 4 wt. percent graphite and 3 wt. percent cellulose fiber. The resulting powder was pressed into tablets of 9 mm. height and diameter and calcined for two hours at 1100° C.

Example II (Comparative Catalyst)

400 g. of crystalline zirconium oxide was mixed with 17 g. graphite and 13 g. cellulose fiber and ground for four hours in a ball mill after which the mixture was pressed into tablets of 9 mm. height and diameter. The tablets were then calcined for two hours at 850° C. The calcined tablets had practically no mechanical strength and disintegrated into powder on handling so that no experiement was made with this catalyst.

Example III (Comparative Catalyst)

870 g. of a wet filter cake of basic zirconium carbonate containing 46 wt. percent zirconium calculated as the oxide was dried for 16 hours at 150° C. The dried material was mixed with 17 g. graphite and 13 g. cellulose fiber and ground for four hours in a ball mill, after which the mixture was tabletted. The tablets were then calcined for two hours at 850° C. The resulting catalyst consisted of practically pure $ZrO_2$.

Example IV

A suspension was prepared of 320 g. $ZrO_2$ in 5 l. water at 65° C. and 278 g. $Zr(NO_3)_4.5\ H_2O$ then dissolved therein. To this was added 226.5 g. $NH_4HCO_3$, the resulting precipitation taking 15 minutes. The mixture was then stirred for one hour before filtering, and the collected precipitate washed well with water. This precipitate was then dried for 16 hours at 120° C. followed by one hour at 400° C. The dried preciptate was mixed with 17 g. graphite and 13 g. cellulose fiber and ground for one hour in a ball mill, after which the mixture was tabletted. The tablets were then calcined for two hours at 850° C. 125 ml. of these tablets were impregnated with a solution of 35 g. $KNO_3$ dissolved in 100 ml. water, and then calcined for a further two hours at 400° C. The resulting catalyst contained 6 wt. percent $K_2O$.

Example V

This catalyst was prepared as catalyst III except that the tablets during their calcination for two hours at 850° C. were placed close to a material containing potassium oxide. In this way potassium was transferred to the catalyst through the vapor phase. The resulting catalyst contained 0.4 wt. percent potassium calculated as the oxide.

Example VI 217 kg. of an aqueous paste of basic zirconium carbonate containing 46 wt. percent zirconium calculated as the oxide was suspended in 500 l. water. 14.5 kg. potassium nitrate was dissolved in the suspension which then dried to a powder. The powder was mixed with 4 kg. graphite and 3 kg. cellulose fiber and tabletted to rings having an outer diameter of 16 mm., an inner diameter of 6 mm., and a height of 10 mm. The rings were finally calcined for two hours at 850° C. The resulting zirconium oxide catalyst contained 6.7 wt. percent potassium calculated as the oxide.

BENCH SCALE EVALUATION OF CATALYSTS

All catalysts, except that of Example II, were evaluated in an electrically heated tube reactor having an internal diameter of 25 mm. The catalyst tablets or rings were crushed and 125 ml. of a sieve fraction from 3 to 4 mm. was placed in the reactor. To this was fed a mixture of hydrocarbon and steam to give an eventual steam to hydrocarbon weight ratio of 0.4. The steam-hydrocarbon feed was first passed through a preheater and then through the reactor, the space velocity being 4.2 liq. vol. hydrocarbon/vol.catalyst/h. The feed passed downwards through the reactor, the temperature at the top of the catalyst bed being 590° C. and the temperature at the center and at the bottom of the bed being 750° C. The reactor effluent was quenched by water injection in the reactor outlet and the composition of the effluent product gas was determined on a gas-chromatograph. Two different hydrocarbon feeds were used, one being a light naphtha fraction having a weight composition of 24.1% iso-pentane, 53.6% n-pentane, 13.5% iso-hexane, 5.6% n-hexane, and 3.2% aromatics, and one being substantially pure n-heptane. The ethylene yield is in general higher from a heptane feed than from a naphtha feed. Yields from two different catalysts can, therefore, only be compared if the same hydrocarbon feed was used.

Further details of the experiements and their results are given in table II.

Catalyst II (Comparative Catalyst) was prepared from crystalline zirconium oxide without any amorphous zirconium oxide or any zirconium oxide which upon heating transforms into amorphous zirconium oxide. Therefore, this catalyst did not obtain any mechanical strength by heating to 850° C. and no experiments could be carried out with this catalyst.

Catalyst I (Comparative Catalyst) had a composition which has been claimed to give a stable catalyst resistant to carbon deposition after heating to 1300° C. In the present example it was tried whether heating to such a high temperature could be avoided by preparing the catalyst from basic zirconium carbonate. Although sufficient strength was obtained at 1100° C. no resistance to carbon deposition was obtained.

Catalyst III (Comparative Catalyst) was prepared in accordance with the present invention except that no alkali metal was included in the catalyst composition. Consequently, the catalyst had a low resistance to carbon deposition.

The remaining catalysts Nos. IV, V and VI are all in accordance with the present invention. They all have a satisfactory strength and also their resistance to carbon deposition is satisfactory since practically no carbon was found on the catalyst after several hundred hours' operation.

PILOT PLANT EVALUATION OF CATALYST

Catalyst No. VI was also evaluated in a tubular pilot plant reactor having a heated length of 6 m. and an internal diameter of 90 mm. 40 l. of catalyst VI was placed in the reactor. A series of oil-fired burners were provided to heat the reactor. To this reactor was fed 200 kg./h. of a naphtha fraction boiling in the range from 38 to 112° C. and containing less than 0.2 vol. percent aromatics and 1–2 vol. percent naphthenes. 120 kg./h. steam was also fed to the reactor giving a steam to naphtha weight ratio of 0.6. The inlet pressure was 10.9 atm. abs., the outlet pressure 1.5 atm. abs. The temperatures were at the inlet 510° C., at the center 750° C., and at the outlet 825° C. The pilot plant operated at these conditions for 490 hours giving an average yield related to the hydrocarbon feed of 29.5 wt. percent $C_2H_4$, 18.9 wt. percent $C_3H_6$, 10.0 wt. percent $C_4H_8$, 5.2 wt. percent $C_4H_6$, 17.7 wt. percent $CH_4$, 6.8 wt. percent $C_2H_6$, 2.5 wt. percent $CO_2$, 7.0 wt. percent saturated hydrocarbons having a carbon number higher than 4, and 1.5 wt. percent $H_2$. There was no indication of carbon accumulation on the catalyst during the experiment and only 2–3 wt. percent C was found on the catalyst after the experiment which is completely tolerable.

TABLE I

| Catalyst number | I | II | III | IV | V | VI |
|---|---|---|---|---|---|---|
| Molar ratio amorphous $ZrO_2$ to total $ZrO_2$, percent | 100 | 0 | 20 | 100 | 100 | 100 |
| Composition, wt. percent: | | | | | | |
| $ZrO_2$ | 44 | 100 | 100 | 94 | 99.6 | 93.3 |
| $K_2O$ | 0 | 0 | 0 | 6 | 0.4 | 6.7 |
| $SiO_2$ | 17 | 0 | 0 | 0 | 0 | 0 |
| $La_2O_3$ | 2 | 0 | 0 | 0 | 0 | 0 |
| $MgO$ | 36 | 0 | 0 | 0 | 0 | 0 |
| Specific surface area, m.²/g | 7.5 | ------ | 4.5 | 1.3 | ------ | ------ |
| Porosity, vol. percent | 36 | ------ | 39 | 32 | 40 | ------ |

TABLE II

| | Experiment number | | | | |
|---|---|---|---|---|---|
| | A | B | C | D | E |
| Catalyst number | I | III | IV | V | VI |
| Pressure, atm. abs | 2.0 | 1.5 | 1.3 | 1.3 | 1.3 |
| Feed | Heptane | Heptane | Naphtha | Heptane | Heptane |
| Yield, wt. percent:[1] | | | | | |
| $C_4H_4$ | 24.7 | 22.8 | 12.0 | 25.7 | 24.2 |
| $C_3H_6$ | 5.9 | 10.7 | 9.2 | 10.8 | 11.5 |
| Duration of experiment hours | 40 | 40 | 230 | 600 | 232 |
| Carbon on catalyst, wt. percent | 50 | 50 | 0.2 | 1.0 | 0.3 |

[1] Related to hydrocarbon feed.

What is claimed is:

1. A process for the manufacture of unsaturated hydrocarbons by a gaseous catalytic reaction wherein a feedstock consisting of hydrocarbons, predominately saturated hydrocarbons, is contacted and cracked at a temperature below 1100° C. and a pressure in the range 0.1–50 atm. abs. in the presence of added steam and free of chlorine and free of oxygen with a catalyst consisting of zirconia prepared from a raw material of which at least part is amorphous zirconium oxide, together with 0.1–10 wt. percent of an alkali metal compound calculated as oxide to form unsaturated hydrocarbons having a lower average number of carbon atoms than the saturated hydrocarbons in the feedstock.

2. A process according to claim 1, wherein the reaction is carried out at a temperature in the range 200–900° C.

3. A process according to claim 1, wherein the reaction is carried out at a temperature in the range 500–850° C.

4. A process according to claim 2, wherein the reaction is carried out at a pressure of 1–15 atm. abs. measured at the reactor outlet.

5. A process according to claim 1, wherein the feedstock consists entirely of a saturated hydrocarbon or a mixture of saturated hydrocarbons.

6. A process according to claim 1, wherein the reaction is carried out in the presence of sulfur.

7. A process according to claim 1, wherein sufficient steam is added to give a weight ratio of steam to hydrocarbon feedstock in the reactor of 0.01–10.

8. A process according to claim 7, wherein the ratio of steam to hydrocarbon feedstock is 0.1–1.0.

9. A process according to claim 1 wherein the amorphous zirconium oxide is initially introduced in the form of a zirconium compound which is transformed on heating into amorphous zirconium oxide.

10. A process according to claim 1 wherein at least 15% of the zirconium oxide is in amorphous form.

11. A process according to claim 1 wherein all the zirconium oxide is in amorphous form.

12. A process according to claim 9 wherein the catalyst is prepared from zirconium hydroxide or basic zirconium carbonate.

References Cited

UNITED STATES PATENTS

| | | | |
|---|---|---|---|
| 2,279,198 | 4/1942 | Huppe | 260—683.3 |
| 3,308,200 | 3/1967 | Bajars | 260—683.3 |
| 2,442,772 | 6/1948 | Marisic et al. | 208—121 |

DELBERT E. GANTZ, Primary Examiner

C. E. SPRESSER, Jr., Assistant Examiner

U.S. Cl. X.R.

208—121, 130; 260—680 R, 683.3

UNITED STATES PATENT OFFICE
CERTIFICATE OF CORRECTION

Patent No. 3,839,485                  Dated    October 1, 1974

Inventor(s) Johannes Wrisberg, Kjeld Jorn Andersen & Erik Mogensen

It is certified that error appears in the above-identified patent and that said Letters Patent are hereby corrected as shown below:

Col. 3, Line 27: "of" (second occurrence) should read --or--

Col. 3, Line 42: "ermal" should read --thermal--

Col. 7, Claim 1, Line 13: "free of oxygen" should read --of free oxygen--

Signed and sealed this 1st day of July 1975.

(SEAL)
Attest:

RUTH C. MASON
Attesting Officer

C. MARSHALL DANN
Commissioner of Patents
and Trademarks